United States Patent [19]

Stager

[11] Patent Number: 5,860,243
[45] Date of Patent: Jan. 19, 1999

[54] DEVICE FOR EXPLOSIVE EXTERMINATION OF RODENTS

[76] Inventor: Jerry J. Stager, 664—4th St., Elko, Nev. 89801

[21] Appl. No.: 874,073

[22] Filed: Jun. 12, 1997

[51] Int. Cl.$^6$ .................................................. A01M 15/00
[52] U.S. Cl. ................................. 43/124; 431/91; 431/264
[58] Field of Search ........................ 43/124, 144; 431/91, 431/264

[56] References Cited

U.S. PATENT DOCUMENTS

| | | |
|---|---|---|
| 968,330 | 8/1910 | De Rose . |
| 1,929,300 | 10/1933 | Atkinson ........................................ 47/1 |
| 2,095,710 | 10/1937 | Offutt et al. ............................. 158/27.4 |
| 2,417,981 | 3/1947 | Graham ........................................ 431/91 |
| 4,005,976 | 2/1977 | Rombach et al. ........................... 431/13 |
| 4,181,492 | 1/1980 | Zinke ........................................ 431/264 |
| 4,494,925 | 1/1985 | Zabotin et al. ........................... 431/158 |

*Primary Examiner*—Robert P. Swiatek
*Attorney, Agent, or Firm*—Keith S. Bergman

[57] ABSTRACT

A torch disperses an explosive mixture of pressurized oxygen and petroleum gas into the burrow of a rodent for subsequent ignition to destroy rodents in the burrow. The torch provides a configurationally sustaining enclosed dispersement system with an elongate body formed sequentially by a mixer, a gas conduit having a valve to regulate gas passage therethrough and an output nozzle insertable into an entry orifice of a rodent burrow. An ignition system supported on the dispersement system provides an electrically powered spark plug carried in the output nozzle to ignite gases therein. The oxygen and petroleum gases are mixed in determinable proportions and pass through and from the distribution system by reason of gas pressure. The gas channel through the torch is not open to the ambient atmosphere except at the orifice of the output nozzle and a flash guard valve carried inwardly adjacent the output nozzle prevents an explosion in the output nozzle from passing inwardly into the gas conduit of the torch.

4 Claims, 2 Drawing Sheets

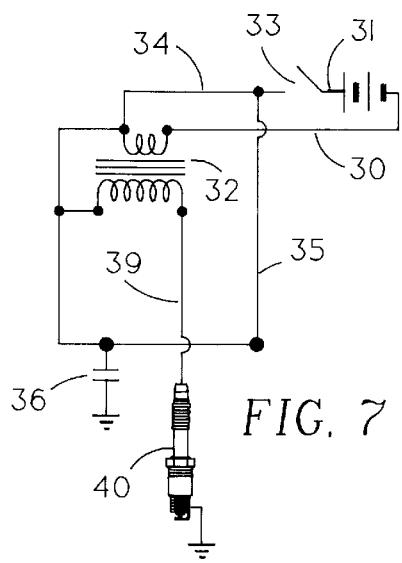
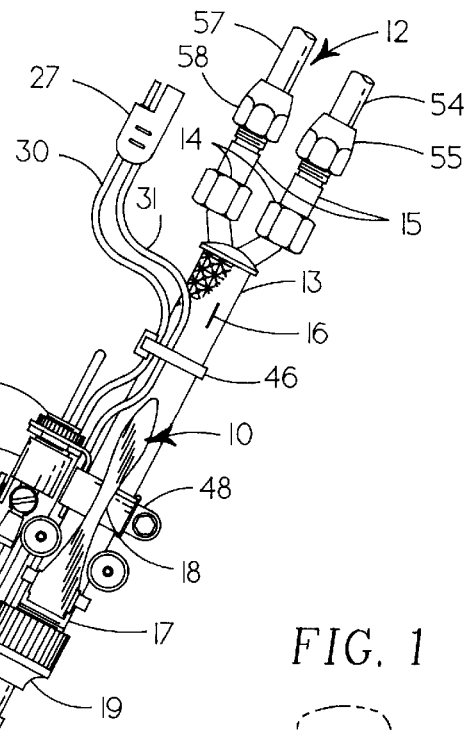
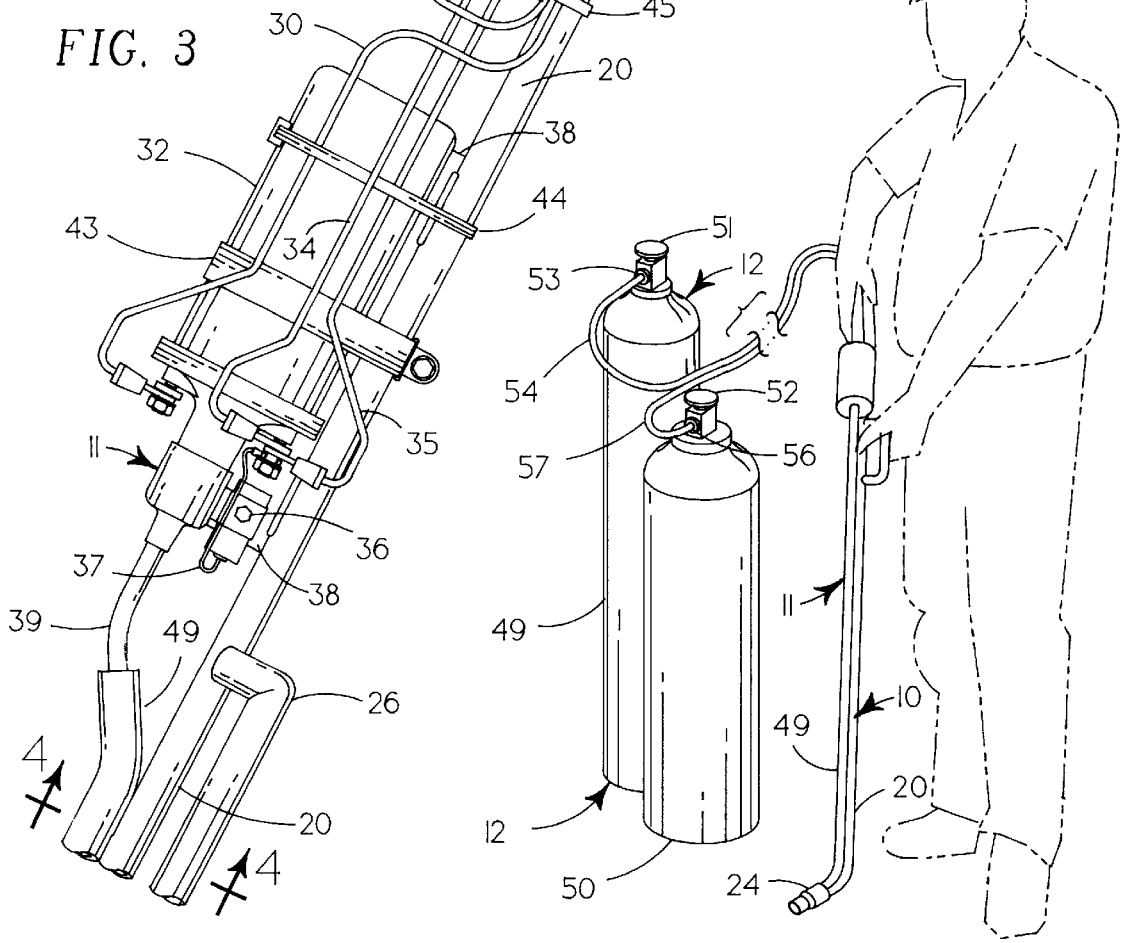

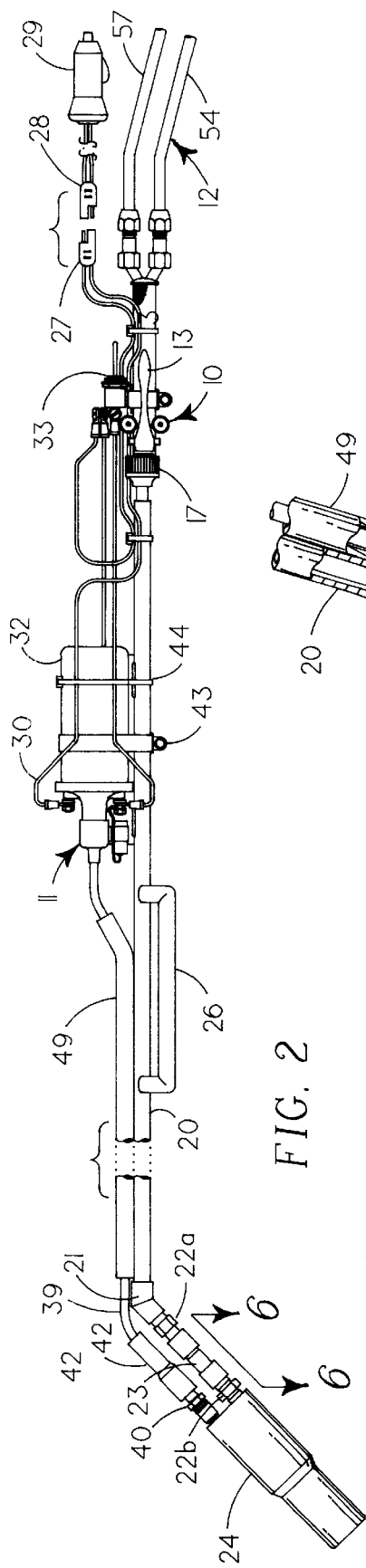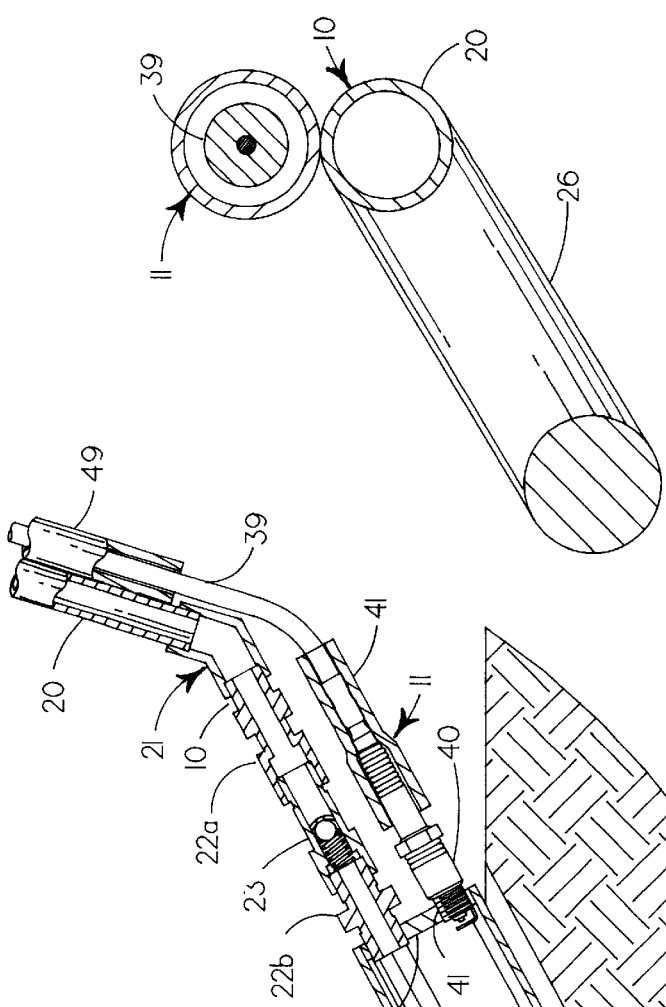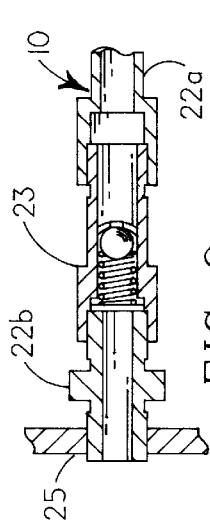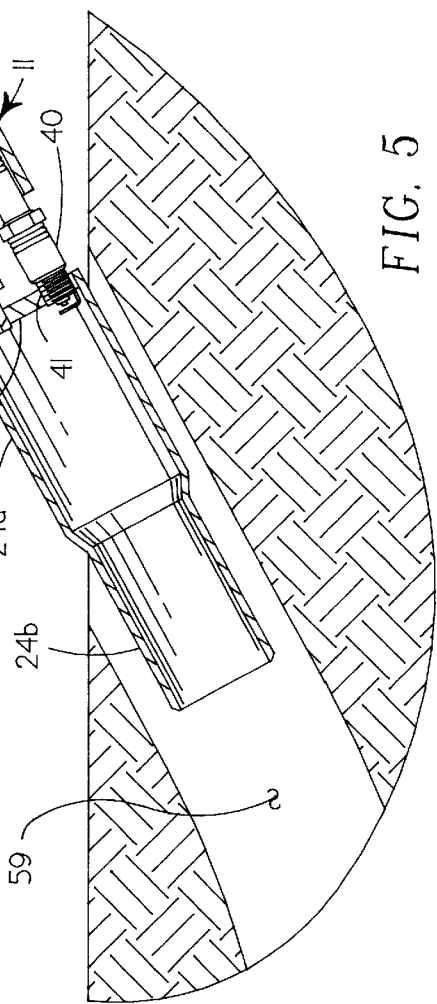

DEVICE FOR EXPLOSIVE EXTERMINATION OF RODENTS

II. BACKGROUND OF INVENTION

IIA. RELATED APPLICATIONS

There are no applications related hereto heretofore filed in this or any foreign country.

IIB. Field of Invention

This invention relates generally to a device that adjustably intermixes at least two explosively reactive gases for pressurized introduction into a rodent burrow with subsequent ignition for explosive extermination of rodents in the burrow.

IIC. Background and Description of Prior Art

Burrowing rodents have been a scourge of mankind probably as long as both have coexisted and during this association, many and various devices and methods have become known to rid man's environment of rodents. Though the history of this field of endeavor has been long, many and various devices and methods have become known and have become increasingly sophisticated over their developmental period, there still remain problems in exterminating rodents in the present day. The instant invention seeks to solve various of these remaining problems by providing a new device for explosive rodent extermination.

The habit of most earth burrowing rodents is to create tunnels of fairly extensive length, often of a branching nature that may form interconnecting networks with multiple entrance and exit ways. The rodents in some cases are sufficiently sophisticated as to create air traps to keep water from their burrows, create blockages to mislead or prevent passage of predators and human antagonists, and perform other similar feats which tend to make extermination more difficult. Extermination efforts have been further hampered by modern environmental concerns which tend to require that any rodent eradication must be environmentally neutral, or at least must not substantially adversely effect the environment over any appreciable period of time. These factors in the recent past have made the extermination of rodents by gases of one sort or another quite popular, especially in commercial field type environments.

Various poisonous gases have been introduced into a burrow system by direct injection or as a result of some chemical reaction caused in the burrow. Such procedures have not become particularly popular or extensively used because of the deleterious effect they may have on the environment in general and even upon the human exterminators involved with the extermination process. Additionally for poisonous gases to be effective, they generally must be contained for some period of time in a burrow system and must permeate throughout that system. Rodents frustrate these ends by blockage, network architecture that ventilates, multiple exits and orifices and the like, so that creating a homogenous distribution of poisonous gases and maintaining it for any period of time in burrows has proven a difficult if possible task.

In the more recent development of rodent eradication by gas, the explosive nature of some gases and their mixtures has been exploited to aid in enhancing the potential of rodent extermination. If a mixture of gases that will sustain an explosive reaction is introduced into a burrow system and subsequently detonated, the resulting explosion tends to distribute reaction products throughout the burrow system without having to plug orifices, or at least all orifices. Additionally the explosion itself creates concussive force that kills rodents or at least aids in so doing, and most of the explosive reactions are of an exothermal nature that generates sufficient heat to destroy or aid in destroying rodents. Reaction products of such explosive reactions normally are gaseous and those gaseous products normally are also destructive to rodents by reason of suffocation, poisoning or otherwise. Normally such explosive type extermination is not particularly environmentally hazardous as the reaction products are commonly materials that are present in the environment and that in smaller amounts are not deleterious to it.

Though extermination of rodents by explosive gaseous materials has been heretofore known, the method has not been widely used or commercially accepted. One reason for lack of acceptance appears to be the dangers that the process may pose to persons involved in such type of extermination, and especially the dangers that might arise to an exterminator by reason of the explosion itself, such as from backfiring, explosive destruction of the apparatus, flying debris and the like. A second factor that may have prevented some commercial acceptance of the process has been the nature of the gaseous materials used in it which do not provide the maximum potential of rodent extermination because of lack of pressurized injection, the nature of the explosive reaction, temperatures at which the explosive reaction occurs and proceeds, the nature of the reaction products and the like.

The instant apparatus attempts to resolve these problems to provide a commercially feasible and economically acceptable explosive gas type rodent extermination device. In distinguishment from prior devices, the instant apparatus uses a supply of liquified oxygen and liquified petroleum gas that is gasified and dispersed through a cut-off valve into a mixing channel that transmits the pressurized admixed gases to an injection nozzle for dispersement into a rodent burrow at pressure above that of the ambient atmosphere. The entire gas channel through the device has no communication with the ambient atmosphere until gas is dispersed from its injection nozzle. The apparatus provides an electrical ignition system that is battery powered by its own power source or the battery of a vehicle, with a coil to increase voltage sufficiently to operate an ordinary automotive spark plug carried to communicate with the injection nozzle to initiate ignition of an explosive reaction and pass the explosive flame front into explosive gases contained in a rodent burrow in which the gas mixture has dispersed. The apparatus has no orifices communicating with the ambient atmosphere through which backfiring may occur and explosive gas contained in it is screened and isolated from the generated explosion to prevent explosive reactions in the apparatus. The operative components of the device are of types commonly available and used in the welding arts to lower initial manufacturing cost and provide simple, easy and economical maintenance.

My invention lies not in any one of these features individually, but rather in the synergistic combination of all of its structural elements that necessarily give rise to the functions flowing therefrom as herein specified and claimed.

SUMMARY OF INVENTION

My invention generally provides a torch having a gas dispersement system, an ignition system and a gas supply system. The gas dispersement system receives at least two explosively reactive pressurized gases in a mixing chamber, passes the admixed gases through a manually operated valve into a channel that transmits the gases through a one-way check valve to an injection nozzle. The dispersement system is rigid enough to be configurationally sustaining, long enough to be operable by a standing operator and provides a handle structure to aid manual manipulation. The ignition system provides a connector to communicate with a battery power supply and pass current from the power supply through a switch and a coil to operate a sparking device carried in the injection nozzle of the dispersement system. The gas supply system provides selectively adjustable amounts of pressurized oxygen and petroleum gas from a liquid supply to the gas dispersement system. For operation the gas dispersement nozzle is inserted in the orifice of a rodent burrow, the gas supply valve operated to disperse pressurized gas into the burrow for a period of time and the ignition switch then operated to institute an explosive reaction in the injection nozzle which is transmitted to the gas mixture in the burrow to propogate the explosive reaction in and throughout the burrow to exterminate rodents there present.

In providing such a device, it is:

A principal object to create a torch that receives a mixture of pressurized explosive gases from a remote gas supply system and transmits the gases through an enclosed dispersement system to an injection nozzle for dispersement in a rodent burrow and subsequent ignition.

It is a further object to create such a torch that allows no communication of the admixed pressurized explosive gases with the ambient atmosphere prior to their dispersement from the injection nozzle to prevent backfires and explosions in the torch itself.

It is a further object to provide such a torch that has an ignition system with an automotive spark plug in the injection nozzle that is powered by a remote battery source and selectively operable by a manual switch to institute an explosion.

A still further object is to provide such a torch that has an adjustably regulated supply of pressurized explosive gases derived from liquified gas supplies at a distance from the torch.

A still further object is to provide the process for the explosive extermination of rodents in burrows that comprises 1) providing an explosive mixture of pressurized gases for selective dispersement and ignition in a rodent burrow; 2) passing a predetermined amount of pressurized gas into the rodent burrow; 3) igniting the gas in the rodent burrow for extermination of rodents there present.

A still further object is to provide such a torch that is of new and novel design, of rugged and durable nature, of simple and economic manufacture and one otherwise well suited to the uses and purposes for which it is intended.

Other and further objects of my invention will appear from the following specification and accompanying drawings which form a part hereof. In carrying out the objects of my invention, however, it is to be understood that its features are susceptible of change in design and structural arrangement, with only one preferred and practical embodiment being illustrated in the accompanying drawings as is required.

DESCRIPTION OF DRAWINGS

In the accompanying drawings which form a part hereof and wherein like numbers of reference refer to similar parts throughout:

FIG. 1 is an isometric, semi-diagrammatic view of my torch positioned for use and interconnected with a liquified gas supply system.

FIG. 2 is an orthographic side view of the torch of FIG. 1 showing its various parts, their configuration and relationship.

FIG. 3 is an enlarged orthographic view of the upper portion of the torch of FIG. 2 showing constructional details.

FIG. 4 is an enlarged traverse cross-sectional view through the body of the torch of FIG. 3, taken on the line 4—4 thereon in the direction indicated by the arrows.

A FIG. 5 is an enlarged, partially cut-away view of the lower portion of my torch in position in a rodent burrow for injection of pressurized explosive gas therein.

FIG. 6 is an enlarged elongate cross-sectional view through the flash guard of FIG. 2, taken on the line 6—6 thereon in the direction indicated by the arrows.

FIG. 7 is an electrical diagram of the circuitry of the ignition system.

DESCRIPTION OF THE PREFERRED EMBODIMENT

My rodent exterminating torch generally comprises gas dispersement system 10 supplied with a pressurized explosive gas mixture from a distant source by gas supply system 12 and having associated ignition system 11 to ignite explosive gas injected by the dispersement system into a rodent burrow.

Gas dispersement system 10 is an elongate structure providing upper, peripherally defined mixer 13 having an internal channel and communicating with plural gas connectors 14 that provide connecting structure 15 to releasably interconnect gas supply system 12. In the instance shown, the gas connectors are two in number, but if a greater number of gases are to be used with my torch, the number of connectors may be correspondingly increased as required. The configuration of mixer 13 is preferably cylindrical and its external surface preferably is provided with covering 16, to aid holding and manual manipulation so that the mixer might serve as an upper handle for my torch. The inner end portion of mixer 13 carries gas control valve 17 to regulate the output of gas from the mixer chamber responsive to motion of control valve lever 18. Gas output through control valve 17 passes through transition element 19 into elongate tubular gas conduit 20. The distal or lower end portion of gas conduit 20 carries elbow 21 to allow angulated interconnection through connector 22a, flashback check valve 23 and connector 22b with output nozzle 24. The output nozzle 24 is a cylindrical structure of larger diameter than the channel 20 of the gas dispersement system interconnected therewith and provides diametrically larger inner portion 24a and somewhat diametrically smaller outer portion 24b, with a combined axial length sufficient to allow insertion spacedly into a rodent burrow. The inner or upper end portion of the output nozzle carries end plate 25 to seal the inner orifice of the output nozzle and provide structure to carry gas system connecting fixture 22b and a spark plug of the ignition system.

The medial portion of elongate conduit 20 may carry U-shaped handle 26 to aid manipulation of the torch, if desired. Preferably the various elements of the gas dispersement system described are formed of metal and they conveniently may be formed from ordinary standardized parts readily available in the present day welding field. The flashback guard 23 is of a type readily available in the welding arts that provides a screen, a check valve or both, as illustrated, to prevent the rearward propagation of an explosive flame front from the output nozzle back through the gas dispersement system. Without such a guard it is possible that reacting gas in the output nozzle might pass or create a flame front that passes rearwardly in the dispersement system forwardly of gas control valve 17 to cause an explosion in the dispersement system.

Ignition system 11 physically carried by and supported on the gas dispersement system provides connector 27 to interconnect with a battery powering source (not shown) at a distance from the torch. Quite conveniently, this powering source may be the battery of a vehicle and if so, a connecting cord having fixture 28 to releasably interconnect with fixture 27 at one end and fixture 29 at the other end to interconnect with an ordinary cigarette lighter of a vehicle is a convenient accessory.

The fixture 27 transmits current through positive lead 30 to coil 32. The negative lead 31 connects with off-on toggle switch 33 to pass negative current through lead 34 to coil 32 and through lead 35, which is supported on the elongate conduit 20 of the gas dispersement system by bracket 38 and interconnected through condenser 36 and line 37 with the negative pole of coil 32, to provide an electrical path through the electrically conductive gas supply system for one side of the ignition system interconnected with the base of spark plug 40. The high voltage output of coil 32 communicates through high voltage spark plug cable 39 to interconnect with the other lead of spark plug 40. This type of spark plug powering system is well known and not novel of itself.

Spark plug 40 is threadedly engaged in hole 41 defined in end plate 25 of the output nozzle 24, with its sparking points extending into the internal chamber defined by the output nozzle to create a spark therein. Preferably the upper portion of the spark plug is covered and protected by spark plug boot 41.

The coil 32 is supported on elongate gas conduit 20 and bracket 38 carried by the conduit by releasable bands 43 and 44 extending thereabout. The other wiring of the ignition system may be fastened in a similar fashion to adjacent portions of the gas dispersement system by releasable banding such as 45 and 46. The toggle switch 33 is supported by one leg of L-shaped bracket 47, the other leg of which is fastened to mixer 13 by adjustable band 48. For protection, the medial portion of spark plug lead 39 may be covered by protective tubing 49 which may be interconnected to the adjacent portion of elongate conduit 20 by adhesion, banding or otherwise to provide a more rigid interconnected structure for my torch.

Gas supply system 12, in the instance illustrated in FIG. 1, provides liquified oxygen container 49 and liquefied petroleum gas container 50, each having associated gauge and output valving mechanisms 51 and 52 respectively. The oxygen valving mechanism 51 provides fixture 53 to releasably interconnect flexible hose 54 which communicates with fixture 55 for interconnection with one gas connector 14 of my torch. The petroleum gas valving mechanism 52 similarly provides fixture 56 to releasably interconnect flexible hose 57 to communicate with fixture 58 for interconnection with the other gas connector 14 of my torch.

In the instance illustrated, only one container of liquified petroleum gas and one container of liquified oxygen are shown, but more than two gases may be used to form an explosive mixture in my torch and a greater number of gas supply containers having interconnections with mixer 13 of my torch are within the ambit and scope of my invention.

The hoses interconnecting the gas supply containers should be long enough to allow positioning of those containers at a distance from a torch which they service and quite conveniently, the containers may be carried in a vehicle such as a pickup truck that may be moved into the vicinity of use of the torch as desired.

Having described the structure of my torch, its operation may be understood.

A torch is created according to the foregoing specification and interconnected with a gas supply system providing at least a supply of pressurized oxygen and a reactively combustible gas such as pressurized liquid petroleum gas. The torch is manually manipulated by a user to move it to the location of rodent burrow 59, as illustrated in FIG. 5, and the output nozzle 24 is positioned in an orifice of that burrow. The soil about the output nozzle may be pushed in about the output nozzle to at least partially seal the burrow orifice about the nozzle to prevent the escape of pressurized gas outwardly from the burrow orifice through which it is being injected.

After such positioning of the torch, gas control valve lever 18 is activated to operate gas control valve 17 to allow a mixture of the combustible oxygen and petroleum gas to pass into and through the gas dispersement system and outwardly from to allow such gas passage, normally for from fifteen to sixty seconds, to allow the explosive gas mixture to permeate throughout a burrow structure, displace the ambient atmosphere therefrom and fill its channels. When the burrow is filled with the explosive gas mixture, toggle switch 33 is operated to pass current through coil 32 and to spark plug 40 to institute a spark between the exposed spark plug points in the output nozzle chamber. Since at this time the output nozzle will contain a mixture of explosive gas, the spark will institute an explosive flame front in the output nozzle and that flame front will proceed outwardly from the nozzle, through its orifice and into the adjacent rodent burrow to cause an explosive reaction therein. The flame front will not pass back through the gas dispersement system by reason of flash guard 23 in the outer portion of that system.

As the flame front proceeds through the explosive gas mixture, an exothermal reaction of fairly high energy occurs between the oxygen and combustible gas when the gasses are admixed in appropriate proportions. Substantial energy will be ho generated that will be manifest in thermal changes including shock and heat, both of which will tend to be lethal to rodents in the burrow enclosing the reaction. Additionally the products of combustion resulting from the explosive reaction will be primarily gaseous products that tend to be lethal to rodents or in fact to other mammals also. Though such explosive reactions in themselves are fairly complex in their explosive reactions in themselves are fairly complex in their details, most of their results tend to be injurious or lethal to rodents in burrows where the reactions take place and the method is quite efficient for exterminating rodents in those burrows, where the carcasses normally remain to prevent or at least lessen any further contamination of the environment.

It is to be noted from the foregoing that with use of the instant torch the explosive gas mixture will be dispersed through output nozzle 24 and into a rodent burrow under some positive gas pressure as determined by the adjustable partial input pressures of the gases involved.

It is also to be noted that the gas dispersement system has no communication with the ambient atmosphere except at the output orifice of the output nozzle, and that an explosive reaction instituted in the chamber of the output nozzle may not pass backwardly into the gas dispersement conduit of the torch because of the flash guard carried in that conduit immediately inwardly adjacent the output nozzle.

It is further to be noted that although the explosive gas mixture described constitutes oxygen and one liquid petroleum gas, various other gases may be used to form an explosive mixture and those other gases are within the ambit and scope of my invention. It may be particularly advantageous in an explosive gas mixture to use a combination of two liquid petroleum gases such as liquified natural gas which is lighter than air and a liquefied propane type gas which is heavier than air to cause better permeation of a rodent burrow system, especially if it has water traps or any substantial differential in vertical extent.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by letters patent, and

What I claim is:

1. A torch for explosive extermination of rodents in their burrows, comprising in combination:

an elongate, configurationally sustaining, enclosed gas dispersement system with first and second ends,
the first end having means for interconnecting a gas supply system and communicating with
a mixer defining an internal channel to contain and intermix pressurized gases received from the gas supply system and pass the intermixed pressurized gases to
a gas control valve operatively communicating with
an elongate gas conduit having an angulated second end portion distal from the gas control valve, with a flash guard valve in the gas conduit adjacent the second end portion, and an output nozzle carried by the second end portion of the gas conduit at the second end of the dispersement system for dispersement of intermixed pressurized gases into a rodent burrow responsive to action of the gas control valve;

an ignition system carried by the gas dispersement system with first means interconnecting an electric power supply and second switch means for selectively passing power from the power supply through a voltage increasing coil to a spark plug carried in the output nozzle to create a spark between points of the spark plug to institute an explosive reaction in intermixed gases in the output nozzle; and a gas supply system having means for providing pressurized explosively reactive gases to the gas dispersement system.

2. The torch of claim 1 wherein the pressurized explosive gases supplied by the gas supply system comprises oxygen and at least one petroleum gas at pressures greater than the pressure of the ambient atmosphere.

3. The process of exterminating rodents in burrows comprising:

a) placing the output nozzle of a torch, having first means for dispersing intermixed pressurized explosively reactive gases in a rodent burrow and second means for selectively instituting on explosive reaction in the intermixed pressurized gases, in the rodent burrow;

b) dispersing an explosively reactive mixture of gases at a pressure greater than that of the ambient atmosphere in the rodent burrow; and c) igniting the explosively reactive gas mixture in the rodent burrow to institute an explosive reaction in the gases to exterminate rodents in the burrow.

4. The process of claim 3 wherein the explosive mixture of gases comprises oxygen and at least one petroleum gas.

\* \* \* \* \*